US012717974B2

(12) United States Patent
Kelly et al.

(10) Patent No.: US 12,717,974 B2
(45) Date of Patent: Aug. 25, 2026

(54) ATTESTABLE SECURE ERASE

(71) Applicant: Microsoft Technology Licensing, LLC, Redmond, WA (US)

(72) Inventors: Bryan David Kelly, Carnation, WA (US); Monish Shantilal Shah, Pune (IN); Shruti Sethi, Sacramento, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/782,985

(22) Filed: Jul. 24, 2024

(65) Prior Publication Data

US 2026/0030390 A1 Jan. 29, 2026

(51) Int. Cl.

*G06F 21/78* (2013.01)
*G06F 21/60* (2013.01)
*G06F 21/64* (2013.01)

(52) U.S. Cl.

CPC ............ *G06F 21/78* (2013.01); *G06F 21/602* (2013.01); *G06F 21/64* (2013.01)

(58) Field of Classification Search

CPC ......... G06F 21/78; G06F 21/602; G06F 21/64
See application file for complete search history.

(56) References Cited

U.S. PATENT DOCUMENTS

2019/0065733 A1* 2/2019 Forehand .................. H04L 9/32
2019/0080118 A1* 3/2019 Brady ....................... G06F 8/65
2020/0028683 A1* 1/2020 Windle ................... H04L 9/088
2021/0103661 A1* 4/2021 Wu ....................... G06F 21/572

OTHER PUBLICATIONS

International Search Report and Written Opinion received for PCT Application No. PCT/US2025/034415, mailed on Oct. 17, 2025, 14 Pages.

* cited by examiner

*Primary Examiner* — Ayoub Alata
(74) *Attorney, Agent, or Firm* — Ray Quinney & Nebeker P.C.; James S. Bullough

(57) ABSTRACT

A method securely erasing data on a storage drive includes transmitting a communication that initiates an erasure operation on a storage drive and receiving a drive erasure attestation generated in association with erasure operation and by a root-of-trust of the storage drive. The drive erasure attestation includes a first claim that contains cryptographic evidence of a measured state of the storage drive following the erasure operation. The method further includes verifying the first claim and instructing a ledger service to record the drive erasure attestation in a ledger in response to the verification. Verification of the first claim depends upon confirmation of a match between first measurement values in the first claim and a first set of stored values previously-verified as corresponding to a correct implementation of the erasure operation.

20 Claims, 6 Drawing Sheets

ATTESTABLE SECURE ERASE

BACKGROUND

Cloud providers provide physical storage resources that persistently store their customer data. In some cases, cloud customers request that cloud providers take measures to erase or destroy their data. For example, a cloud customer may request data destruction when moving away from one cloud provider in favor of another. Additionally, a cloud provider may, at times, decommission and replace aging storage drives that begin to experience performance degradation. Cloud storage customers commonly request that the cloud provider implement measures to remove their data from all drives being decommissioned.

A vast majority of computer system components can be repurposed for some type of after-life, such as through directed recycling, harvesting for specific parts that can be reused, or general repurposing (e.g., to serve a different end-user). While this is also true of non-volatile data storage drives such as solid-state drives (SSDs) and hard disks, cloud storage customers tend to resist these types of recycling practices for data security reasons, instead preferring that these storage drives be physically destroyed, such as by processes that crush or shred drives into dust and small debris. Although cloud providers typically comply with customer requests for drive destruction, cloud storage providers recognize cost recovery and environmental benefits that could be realized if data storage customers were more accepting of data erasure and drive recycling/reuse practices.

Unfortunately, existing data erasure processes lack reliability, accountability, and consistency in implementation. In some older storage drives, data erasure is implemented by marking blocks as "free" and leaving them for garbage collection at a later time. This is undesirable, as there is no real mechanism for guaranteeing that a block marked for garbage collection will actually be erased. Other storage drives claim to implement secure processes that erase blocks at process runtime; however, these existing erasure processes of this type have proven untrustworthy in industry implementations. Specifically, there have been a number of scenarios in which destroyed data was subsequently found to be partially recoverable (e.g., due to blocks being marked as bad and "skipped" during the erasure process or other reasons). These scenarios have resulted in an industry-wide loss in customer confidence.

Although there are some services that claim to provide secure data erasure, these services are offered by third parties that lack manufacturer-level understanding and control over the inner workings of each individual drive. Consequently, these services typically cannot guarantee complete erasure in all scenarios. For example, some drives are manufactured to include "overprovisioned" storage space that is excluded from the initial logical-to-physical address mapping of a drive and then dynamically subbed in (e.g., to replace bad blocks or for other reasons) on an as-needed basis. Third-party erasure services may lack access to overprovisioned blocks or other stored data, and this has created vulnerabilities that further severely affect customer trust.

For all of the above reasons, the current industry best practice is to destroy drives that store sensitive customer data. However, data destruction entails moving drives from in-rack storage locations to shredders that are managed by human technicians. Current drive destruction measures lack irrefutable audibility and require entrusting a human technician to perform a requested task. As a result, cloud providers are not currently able to offer cloud storage customers any real guarantee that drives sent to shredders are actually placed in shredders (e.g., as opposed to being pocketed or subject to other misuse by technicians).

SUMMARY

According to one implementation, a method of securely erasing user data from a storage drive includes transmitting a communication that initiates an erasure operation on a storage drive and receiving a drive erasure attestation generated in association with the erasure operation and by a root-of-trust of the storage drive. The drive erasure attestation comprises a first claim that includes cryptographic evidence of a measured state of the storage drive following the erasure operation. The method further includes verifying the first claim and instructing a ledger service to record the first claim in a ledger in response to verifying the first claim. The first claim is verified by confirming a match between the first measurement values in the first claim and a first set of stored values previously verified as corresponding to a correct implementation of the erasure operation. In some implementations, the drive erasure attestation further comprises a certificate chain that is recorded in the ledger along with the first claim.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein-disclosed technology provides a secure attestable methodology for erasing sensitive data that is not subject to any of the aforementioned security vulnerabilities. According to one implementation, a storage drive is manufactured to include a root-of-trust (RoT) that provides device-critical security functions that include collecting measurements of the storage drive state following erase operations and generating "attestations" that include the collected measurements and that are usable to cryptographically verify each erasure operation executed accurately and to completion.

According to the here-disclosed methodology, measurements collected by the ROT are provided to and verified by an attestor (e.g., web-based software service) that compares the collected measurements to stored measurements that are known to evidence correct and complete execution of the corresponding erase operation(s). In some implementations, these stored measurements are defined by the drive manufacturer (e.g., the party with maximum control over the inner workings of the drive and its firmware) and audited by a third-party auditor to ensure that the manufacturer-provided measurements do, in fact, evidence complete and accurate execution of the erase operation. Once each erase operation is verified by the attestor, the corresponding cryptographic measurements are, along with other data, recorded in a ledger. In one implementation, the ledger is immutable and confidential, with access limited to the owner of the data stored on or deleted from the storage drive.

Figure 1:
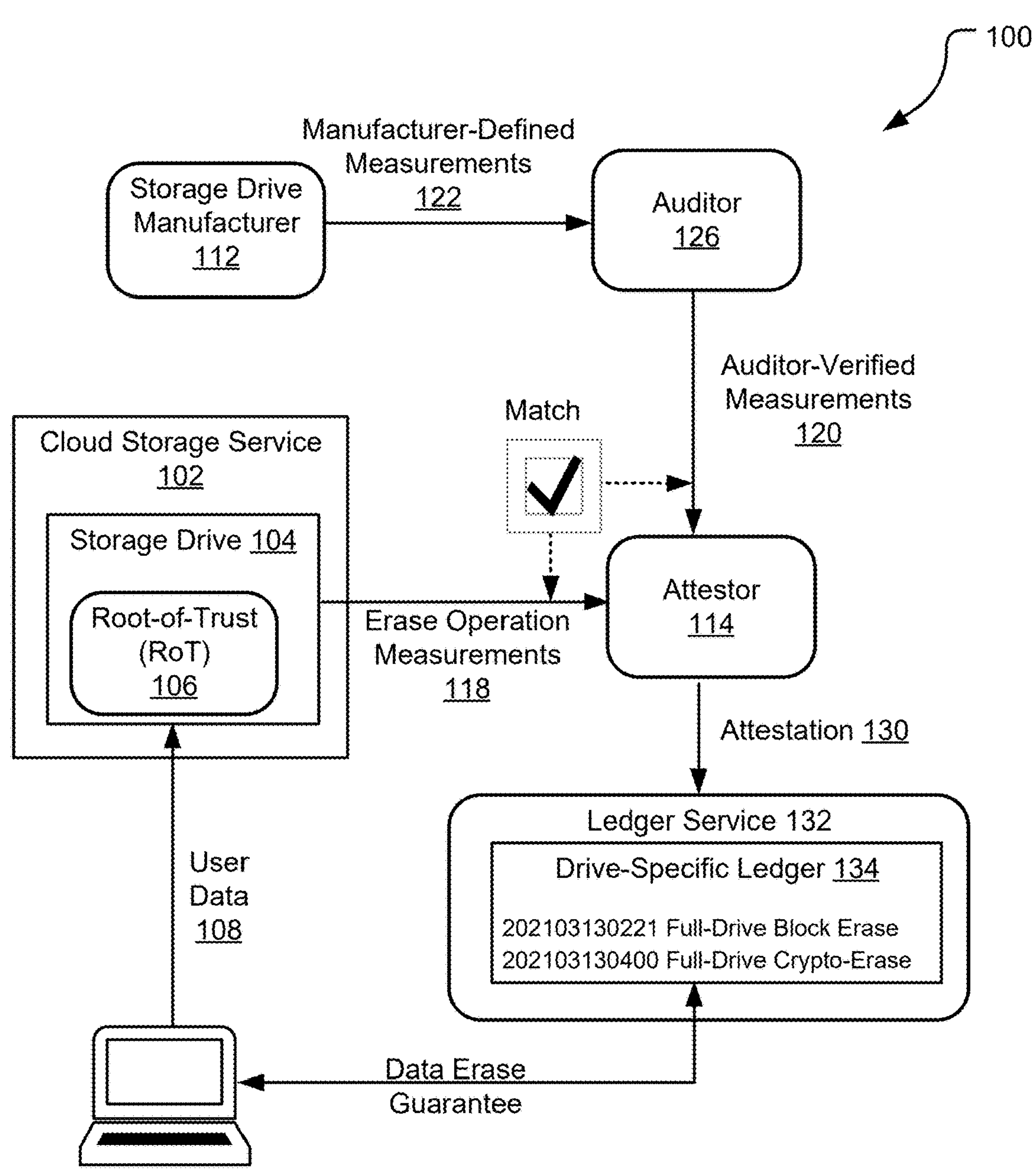
FIG. 1 illustrates an example system that implements attestable secure erasure operations on a storage drive.

FIG. 1 illustrates an example system 100 that implements attestable secure erasure operations. The system 100 includes a cloud storage service 102 that provides a cloud-based data storage service to users. The cloud storage service 102 receives user data from various end users and stores the user data on various storage drives that are owned and operated by the cloud storage service 102.

In FIG. 1, the cloud storage service 102 is shown to include a storage drive 104 that is receiving user data 108. In various circumstances, the storage drive 104 may be provided with a request to erase the user data 108. For example, the cloud storage service 102 may migrate (copy) the user data 108 to another, newer storage drive and then perform an erase on a main storage area of the storage drive 104, such as to prepare the drive for retirement or to ready the drive to receive and store data from another end user.

When the cloud storage service 102 instructs the storage drive 104 to perform a data erase operation, the cloud storage service 102 provides the storage drive 104 with a recordation instruction. A root-of-trust (RoT 106) of the storage drive 104 executes the recordation instruction by taking a series of erase measurements that document the state of the storage drive 104 immediately following the data erase operation. These measurements are input to a hashing algorithm and stored in platform configuration registers (PCRs) of the RoT 106, as is further discussed below with respect to FIG. 2. Upon request, the RoT 106 retrieves these hashed measurements (shown in FIG. 1 as erase operation measurements 118) from the PCRs and outputs the erase operation measurements 118 along with other related information, such as the type of erase operation, the scope of the erase operation (e.g., physical addresses affected), and various metadata. The erase operation measurements 118 are provided to an attestor 114 (e.g., a web-based application that provides a software-implemented attestation service). The attestor 114 compares the erase operation measurements 118 to a set of auditor-verified measurements 120. The auditor-verified measurements 120 are measurements that have been previously confirmed, by an auditor 126, as evidence of a correctly and fully executed erase operation. The auditor 126 can be understood as a web-based service, e.g., of a web-based application, that performs auditing operations that are either software-implemented, human-implemented, or some combination thereof).

In the system of FIG. 1, a storage drive manufacturer 112 (e.g., the manufacturer of the storage drive 104) defines "erasure criteria," which is herein used to refer to a collection of evidence that can be extracted from a storage drive to confirm whether or not that storage drive executed an erase operation accurately and to completion. The erasure criteria include one or more sets of manufacturer-defined measurements 122 indicative of data erasure. The manufacturer-defined measurements 122 are provided to a third-party auditing service (e.g., auditor 120), which verifies the integrity of the measurements by conducting extensive testing to ensure that the manufacturer-defined measurements 122 do, in fact, evidence a complete and correct erasure operation each time they are collectively observed. Upon verifying the accuracy of the manufacturer-defined measurements 122, the auditor 120 cryptographically endorses the manufacturer-defined measurements 122 and provides the endorsed measurements as "auditor-verified measurements 120" to the attestor 114.

When the attestor 114 confirms a match between the erase operation measurements 118 read from the storage drive 104 and the auditor-verified measurements 120, the erasure is verified, and the attestor 114 generates an attestation 130 that attests to the accurate erasure. The attestation 130 includes the erase operation measurements, a unique cryptographic identifier for the storage drive 104, and may include other information, such as information that describes the type and scope of the erase operation performed on the storage drive 104. The attestation 130 is provided to a ledger service 132 (e.g., a web-based application) that records claims made in the attestation 130 on a drive-specific ledger 134. The drive-specific ledger 134 is, in one implementation, a confidential, distributed ledger that is read-accessible exclusively to an owner of data stored (or previously stored) on the storage drive 104 that the ledger is associated with. For example, the drive-specific ledger 14 may be maintained within a security boundary that off limits to a cloud storage provider that manages the cloud storage service 102, meaning that administrators, staff, and developers of the cloud storage provider all lack access to the drive-specific ledger 134. In one implementation where the storage drive 104 receives the user data 108 from a virtual machine (VM) operated by the cloud storage service 102, the hypervisor on the host machine also lacks access to the drive-specific ledger 134. The owner of the user data 108 can, however, access the drive-specific ledger 134 through a secure online portal.

Figure 2:
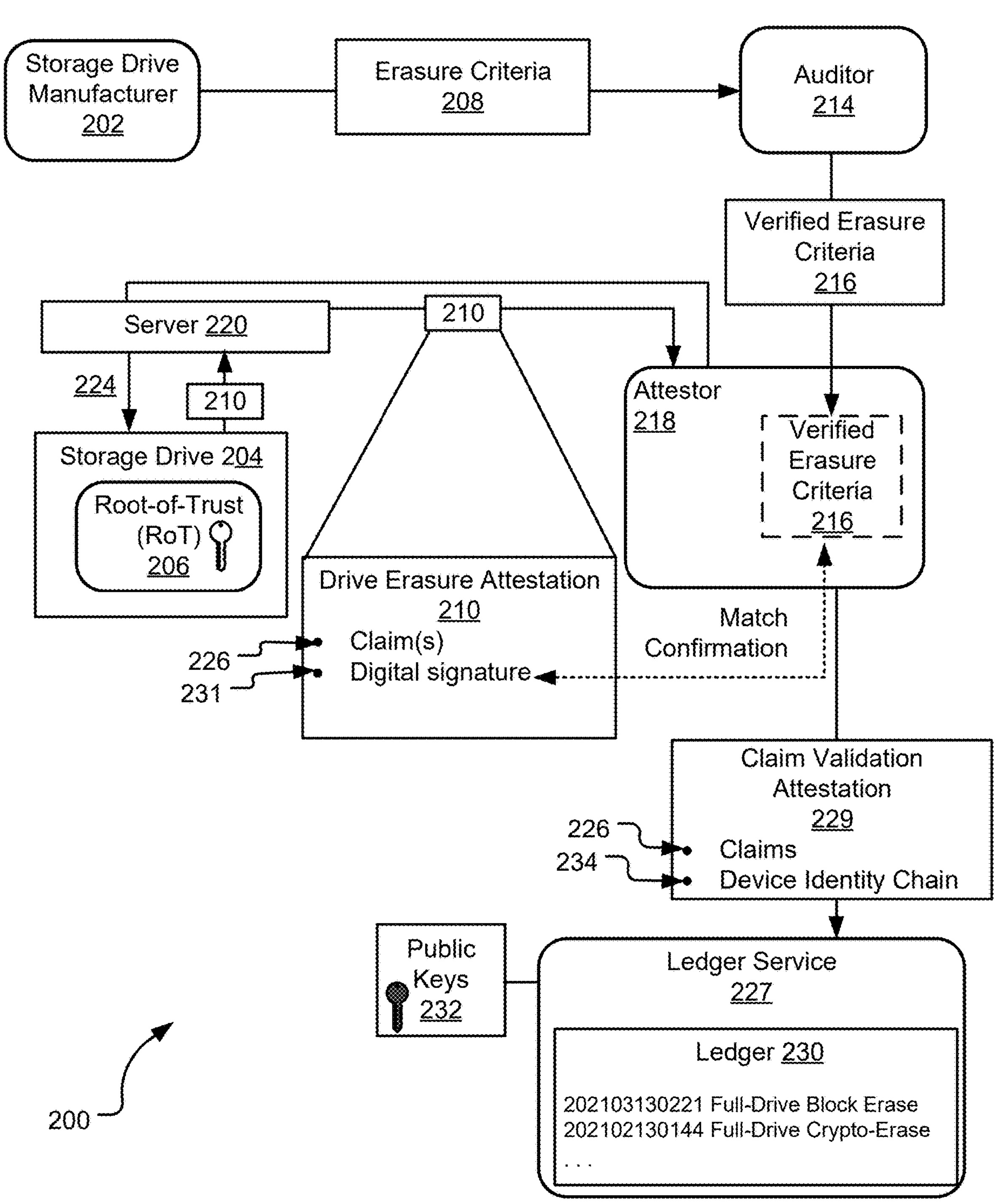
FIG. 2 illustrates another example system that implements attestable secure data erase operations on a storage drive.

FIG. 2 illustrates another example, system 200, that implements attestable secure erasure operations on a storage drive 204. The storage drive 204 includes one or more tangible computer-readable storage media that persistently store user data on one or more storage drives, which may include one or more hard disk drives (HDDs) or solid-state drives (SSDs). A storage drive manufacturer 202 designs the storage drive 204 to include a root-of-trust (RoT 206) that is implemented by firmware, hardware, or a combination of thereof. In one implementation, the RoT 206 is an integrated circuit chip (ICC) such as an application-specific integrated circuit (ASIC) or field programmable gate array (FPGA) that securely manages device encryption keys, performs encryption/decryption operations, takes measurements of the drive state, and performs attestation operations that provide various cryptographic assurances for the storage drive 204 as a whole. The RoT 206 stores cryptographic keys in a location inaccessible to a primary controller of the storage drive, which is, for example, implemented by a system-on-chip (SoC)).

In one implementation, the RoT 206 is implemented by a trusted platform module (TPM) chip that includes a secure crypto-processor designed to carry out various cryptographic operations. The RoT 206 includes firmware executable to provide cryptographic assurances of various operations performed by the storage drive 204 including erase operations.

The RoT 206 is configured to take measurements of the storage drive 204 in association with (e.g., directly following) each erase operation. Each set of measurements collected in association with the same erase operation is hashed by an algorithm per a methodology that allows a significant quantity of data to be concisely represented with high precision. The hashes corresponding to collected measurements are stored in platform configuration platform registers (PCR) of the TPM chip. These stored, hashed measurements are also referred to in the following description as "PCR values." PCRs are typically used to store integrity measurements of a code (e.g., software state) running on the system. In the disclosed system, the PCRs are additionally used to store measurements of non-volatile memory cells dedicated to storing customer data. Collectively, these stored measurements evidence the state of the device at the time of measurement collection.

In various implementations, the storage drive 204 is configured to carry out various different types of erase operations, and the RoT 106 is configured to generate one or more claims in association with each erase operation. Each claim corresponding to an erase operation includes measurements of the storage drive 204 that have been hashed by a hashing algorithm and stored in the PCRs of the RoT 206. The measurements of a given claim are usable to cryptographically validate a certain type of state information pertaining to the storage drive 204 at the time of measurement collection. Each claim can be either recorded locally on the storage drive 204 and/or included in an output generated by the RoT 206 that is referred to herein as a drive erasure attestation 210.

In various implementations, the drive erasure attestation 210 assumes different forms. In one implementation, the drive erasure attestation 210 is a certificate generated by the RoT 206 that includes claims 226 of one or more erase operations as attributes of the certificate (a "device attestation certificate"). This certificate may include a public attestation key (discussed further below) and include a digital signature 231 generated using a private key of the RoT 206 (e.g., a private identity key corresponding to a public identity key that has been endorsed by a certificate authority (CA), as is also discussed further below. In another implementation, the drive erasure attestation 210 is not a certificate but instead another data structure—a "quote"—that includes the claims 226 of each erase operation. The quote is signed by a private key of the RoT 206 (e.g., either a private attestation key or a private identity key, both of which are discussed further below).

In one implementation, the RoT 206 manages encryption keys and is configured to execute crypto-erase operations on behalf of the storage drive 204. A crypto-erase operation entails the destruction of one or more cryptographic key(s) used to encrypt user data stored on the storage drive 204 so that the corresponding encrypted data (ciphertext) cannot be recovered in the future. A crypto-erase operation may, for example, be initiated in response to the receipt of a command from a host device or user interface coupled to the storage drive 204. Each crypto-erase operation provides for the destruction of the key(s) used to encrypt user data stored on the storage drive 204. When carried out correctly, a crypto-erase operation destroys one or more encryption or decryption keys without altering the corresponding ciphertext representation of user data. Following a correctly executed crypto-erase operation, the storage drive 204 no longer possesses the key(s) that are needed to read data, some or all ciphertext residing on the storage drive 204.

The RoT 206 is configured to collect measurements of the storage drive 204 following a crypto-erase operation. These measurements are hashed and stored in PCRs of the RoT 206. Upon request, the RoT 206 may generate a "crypto-erase claim" including hashed measurements ("PCR values") that collectively serve as cryptographic evidence useable to determine whether or not the crypto-erase operation executed correctly and to completion. In one implementation, the PCR values in a crypto-erase claim evidence a complete state of firmware installed on the storage drive 204, a complete security configuration of the storage drive 204 (e.g., security software and settings that control access to the storage drive 204), and a state of data that was targeted by the crypto-erase operation (e.g., measurements of data residing in memory locations or registers previously-storing the cryptographic key(s), or storing pointers to the cryptographic keys, that were slated for destruction by the crypto-erase operation).

In some implementations, the RoT 206 automatically generates a crypto-erase claim each time it carries out a crypto-erase operation. In other implementations, crypto-erase claims are generated upon receipt of a specific request associated with a crypto-erase operation, such as a request to record a claim or to generate a drive erasure attestation that includes a claim.

In addition to or in lieu of the above-described crypto-erase operation, the storage drive 204 is, in some implementations, configured to perform another type of erase operation known as "block erase." When carried out correctly, a block erase operation erases user data (or user ciphertext, if the data is encrypted) rather than the corresponding encryption/decryption keys. In one implementation, a block erase operation is driven by a firmware controller external to (separate from) the RoT 206 of the storage drive, and the RoT 206 is configured to collect drive state measurements that are usable to cryptographically verify the success of the block erase operation.

In implementations that support block erase, the RoT 206 is configured to generate a "block erase claim" in association with each block erase operation—e.g., either automatically or upon receipt of a request for claim recordation or generation of a drive attestation certificate. Similar to the above-described crypto-erase claim, a block erase claim includes PCR values that cryptographically evidence a complete state of firmware installed on the storage drive 204 and complete security configuration of the storage drive 204 (e.g., security software and settings that control access to the storage drive 204). Additionally, the PCR values of the block erase claim evidence a state of user data blocks that were targeted by the secure erase operation (e.g., to demonstrate that the blocks of user data were, in fact, erased).

Validation of each of the above-described types of claims (e.g., block erase claims and crypto-erase claims) entails comparing the PCR values of a given block-erase claim or crypto-erase claim to a corresponding set of stored values that are, in advance of the erase operation, verified as representing cryptographic proof of a correct implementation of the associated type of erase operation.

In the system 200, the PCR values of a given claim are verified via a comparison to "erasure criteria 208," which is defined by a storage drive manufacturer 202 and independently audited by the auditor 214. The erasure criteria 208 includes PCR values identified by the storage-drive manufacturer 202 as representative of a complete and correct execution of a given type of erase operation, such as a crypto-erase operation or a block erase operation. For example, the storage drive manufacturer 202 may define the erasure criteria 208 with respect to each of multiple different device models and/or for various security configurations and firmware versions that could potentially be installed on each of the device models.

In one implementation of the above, the storage drive manufacturer 202 performs testing to determine an exact set of PCR values that, when observed, indicate a particular security configuration and firmware state (e.g., firmware version) on the storage drive 204. Then, for various different security configurations and firmware states, the storage drive manufacturer 202 further determines (e.g., experimentally) the PCR values that correspond to data blocks targeted by the erase operation (e.g., storing the user ciphertext or encryption keys for user data) that indicate the erase occurred as expected and intended.

To ensure device manufactures are held accountable for determining and providing accurate erasure criteria 208 for each device model, security configuration, firmware version, and erase operation type (e.g., block erase operation v. crypto-erase operation), the erasure criteria 208 are provided to the auditor 214 (e.g., a third-party service) that performs independent, rigorous testing to verify that the erasure criteria 208 correctly define a complete and accurate collection of evidence that, when observed, indicates—e.g., in all cases-a correct and complete execution of a corresponding type of erasure operation.

After verifying the erasure criteria 208 from the storage drive manufacturer 202, the auditor 214 outputs verified erasure criteria 216, which can be understood as referring to some or all of the erasure criteria 208 further appended with an endorsement of the auditor 214. An attestor 218 stores the verified erasure criteria 216 for use in comparison relative to claims made by the RoT 206 in association with various erase operations during the lifetime of the storage drive 204.

In one implementation, the storage drive 204 is used to store data of a virtual machine (VM) that executes on a server 220 at a data center. The server 220 acts as an intermediary that relays communications between the storage drive 204 and the attestor 218 in association with each crypto-erase and block-erase operation executed by the storage drive 204. In some implementations, the server 220 is used to initiate an erase operation. For example, a data center administrator may provide a command or other input that causes the server 220 to send erase command(s) to the storage drive 204 and/or to inform the attestor 114 of a new erasure operation. The attestor 218 may, in some implementations, orchestrate and control the entire erasure and attestation process, using the server 220 as an intermediary to communicate with the storage drive 204.

When a secure data erase is initiated, the attestor 218 transmits erase instructions 224 to the server 220. The erase instructions 224 may, in some implementations, comprise a sequence of communications as opposed to a single communication (see, e.g., erase and attestation operations discussed with respect to FIG. 3) The erase instructions 224 instruct the storage drive 204 to perform one or more erase operations and to collect and record measurements in association with each requested erase operation. In response to receiving the erase instructions 224, the requested erase operation(s) are executed, and the RoT 206 takes measurements following each erase operation. The measurements are hashed and stored in PCRs of the RoT 206. In one implementation, the erase instructions 224 include a nonce value (e.g., a random or non-repeating number), and the erase instructions 224 further include an instruction to generate an attestation certificate that includes the nonce value. The use of this nonce value in the erase instructions 224 and corresponding drive erasure attestation 210 reduces the likelihood of forged attestations, e.g., prevents a cyber attacker from forging the attestation by causing the storage drive 204 to present an old drive attestation certificate.

At the completion of the erase instructions 224, the RoT 206 generates the drive erasure attestation 210, which includes the claims 226 (e.g., PCR measurements of the corresponding erasure operation(s)). For example, the claims 226 may include a first claim that includes a first set of PCR values recorded in association with a crypto-erase operation and a second claim that includes a second set of PCR values recorded in association with a block erase operation. In addition to the claims 226, the drive erasure attestation 210 is endorsed via a digital signature 231 of the RoT 206 that is generated using a private key of the RoT. In various implementations, the drive erasure attestation assumes different forms and is endorsed and verified in different ways.

In one implementation, drive erasure attestation 210 is endorsed by a signature generated using a private identity key of an asymmetric identity pair generated within the RoT 206. For example, upon initial provisioning of the storage drive 204, the RoT 206 generates an asymmetric key pair referred to below as the "identity key pair," which includes both a public identity key and a private identity key. The private identity key can be understood as a cryptographic identity that is unique to the RoT 206. Following the generation of the identity key pair, the RoT 206 passes the public identity key to a certificate authority (CA), such as the device manufacturer, within a certificate signing request (CSR). The CA returns a "device identity certificate" that includes the device's public identity key, which is signed by a private key of the CA. The RoT 206 may then give the device identity certificate to an external entity, such as the attestor 218 or ledger service 227, which can, in turn use the public identity key in the device identity certificate to validate a digital signature of the storage drive 204 that is generated using the corresponding private identity key (e.g., a key securely maintained by the RoT 206 that is not given out).

In one implementation, the private identity key of the RoT 206 serves as the primary endorsement of the drive erasure attestation 210. For example, the claims 226 are transmitted to the attestor 218 as part of a quote that includes the claims, and that is signed using the private identity key of the RoT 206. In another implementation, an additional layer of security is created by leveraging yet another RoT-specific asymmetric key pair referred to herein as an "attestation key pair." For example, the RoT 206 self-generates the attestation key pair, which includes a public attestation key (to be given out) and a private attestation key maintained by the RoT 206. The attestation key pair is to be used exclusively to endorse and verify drive erasure attestations generated by the RoT 206. For example, the RoT 206 may generate an attestation certificate that includes the public attestation key, and that is endorsed by the device identity certificate (generated as described above). An entity that receives the attestation certificate can—in the future—utilize the public attestation key in the attestation certificate to validate a signature generated using the corresponding private attestation key. For example, the drive erasure attestation 210 may include a quote including the claims 226 that is signed using the private attestation key of the RoT 206.

The above-described use of an asymmetric attestation key pair, in addition to an asymmetric identity key pair, makes it more difficult to "fake" the drive erasure attestation 210 by adding a layer to the chain endorsement. In this case, a signature generated using the attestation private key of the RoT 206 serves to prove possession of the attestation key pair that was endorsed in a previously communicated attestation certificate, by the private identity key of the RoT 206, which could not have been authenticated but—for possession of the identity key pair that was endorsed by the CA of the storage drive 204.

In FIG. 2, the drive erasure attestation 210 is shown to be endorsed by a digital signature 231. For example, the digital signature 231 is generated using the private identity key of the RoT 206 (which is, as described above, endorsed by the CA of the storage drive 204). Alternatively, in other implementations, this digital signature 231 is generated using the private attestation key of the RoT 206.

The server 220 transmits the drive erasure attestation 210 to the attestor 218, which, in turn, compares the claims made in the drive erasure attestation 210 to the verified erasure criteria 216 to confirm that each claim in the drive erasure attestation 210 does, in fact, evidence a correct and complete implementation of a corresponding type of erase operation indicated by the claim. In one implementation where the drive erasure attestation 210 attests to both a crypto-erase claim and a block-erase claim, this comparison includes confirming two sets of matched PCR values: (1) a first match between a first set of PCR values included in a crypto-erase claim of the drive erasure attestation 210 and a first set of stored PCR values that have been verified, by the auditor 214, as evidencing a complete and correct crypto-erase operation; and (2) a second match between a second set of PCR values included in a block-erase claim of the drive erasure attestation 210 and a second of stored PCR values that have been verified, by the auditor 214, as evidencing a complete and correct block erase operation.

In response to confirming the validity of all claims set forth in the drive erasure attestation 210 per the above-described match confirmation operations, the attestor 218 transmits a claim validation attestation 229 to a ledger service 227 for recordation on a ledger 230. The claim validation attestation 229 serves as evidence of a correct and complete execution of the erase operation(s) corresponding to the claims 226 in the drive erasure attestation 210. The erasure attestation 229 includes the claims 226 as well as a chain of cryptographic endorsements (shown as device identity chain 234), including, for example, a certificate generated by the attestor 218, a certificate of the auditor 214, the drive erasure attestation 210, and the device identity certificate 228.

The ledger service 227 is, during initial provisioning operations of the storage drive 204, provided with various public keys 232 usable to verify each entity in the device identity chain 234. For example, these keys may include the public attestation key of the storage drive 204 that is needed to validate the digital signature 231 in the drive erasure certificate 210; the public identity key of the storage drive 204 that is needed to validate the device identity certificate 228; the public key of the CA usable to verify a CA endorsement included in the device identity certificate 228; and public keys of the attestor 218 and the auditor 214 that are usable to authenticate endorsements of the attestor 218 and the auditor 214, respectively.

Upon receipt of the claim validation attestation 229, the ledger service 227 extracts a storage drive identifier included in the claim validation attestation 229 (e.g., a mac identifier of the storage drive 204 or IP address of the server 220 paired with an identifier used by the server 220 to identify the storage drive 204) and uses the device identifier to retrieve the appropriate stored public identity key (and, if different than the identity key, a stored attestation key) for the storage drive 204. Based on the device identifier or other information in the claim validation attestation 229, the ledger service 227 retrieves other applicable public keys needed to verify respective endorsements within the device identity chain 234, such as the public key of the CA, a public key of the attestor 218, and/or a public key of the auditor 214. Using these public keys, the ledger service 227 validates (confirms the authenticity of) each endorsement (certificate) included in the device identity chain 234.

In response to verifying the authenticity of each endorsement included in the device identity chain 234, the storage drive ledger service 227 updates a ledger 230 that is maintained in association with the unique cryptographic identity of the storage drive 204 (e.g., the public key of the device's identity key pair). This update creates a ledger entry that includes the PCR values in each of the claims 226 as well as other information relevant to each erase operation (e.g., the type of erase operation, the physical addresses of blocks targeted by the erase operation, timestamps of the erase operation(s)).

In one implementation, the ledger 230 is a decentralized (distributed) ledger backed by Blockchain or Blockchain-like technology. As described with respect to FIG. 1, the ledger 230 may, in some implementations, be a confidential ledger that is accessible exclusively to the owner(s) of data stored on the storage drive 204. For example, the ledger service 227 may be maintained within a security boundary that is off-limits to a hypervisor executing on the server 220 that hosts a VM that the storage drive 204 has been dedicated to support.

Per the above-described operations, the ledger 230 is tied to the unique cryptographic identity of the storage drive 204 and each update to the ledger 230 is conditioned upon validation of all endorsements within device identity chain 234. This guarantees that that erase operation logged in the ledger 230 corresponds to an accurate and completely-executed erase operation. Thus, the ledger 230 offers a verifiable guarantee of data erasure to the owner(s) of data stored on the storage drive 204.

Within the framework of the above-described system 200, the storage drive 204 can be purged of user data and then re-purposed for re-use or recycle.

Figure 3:
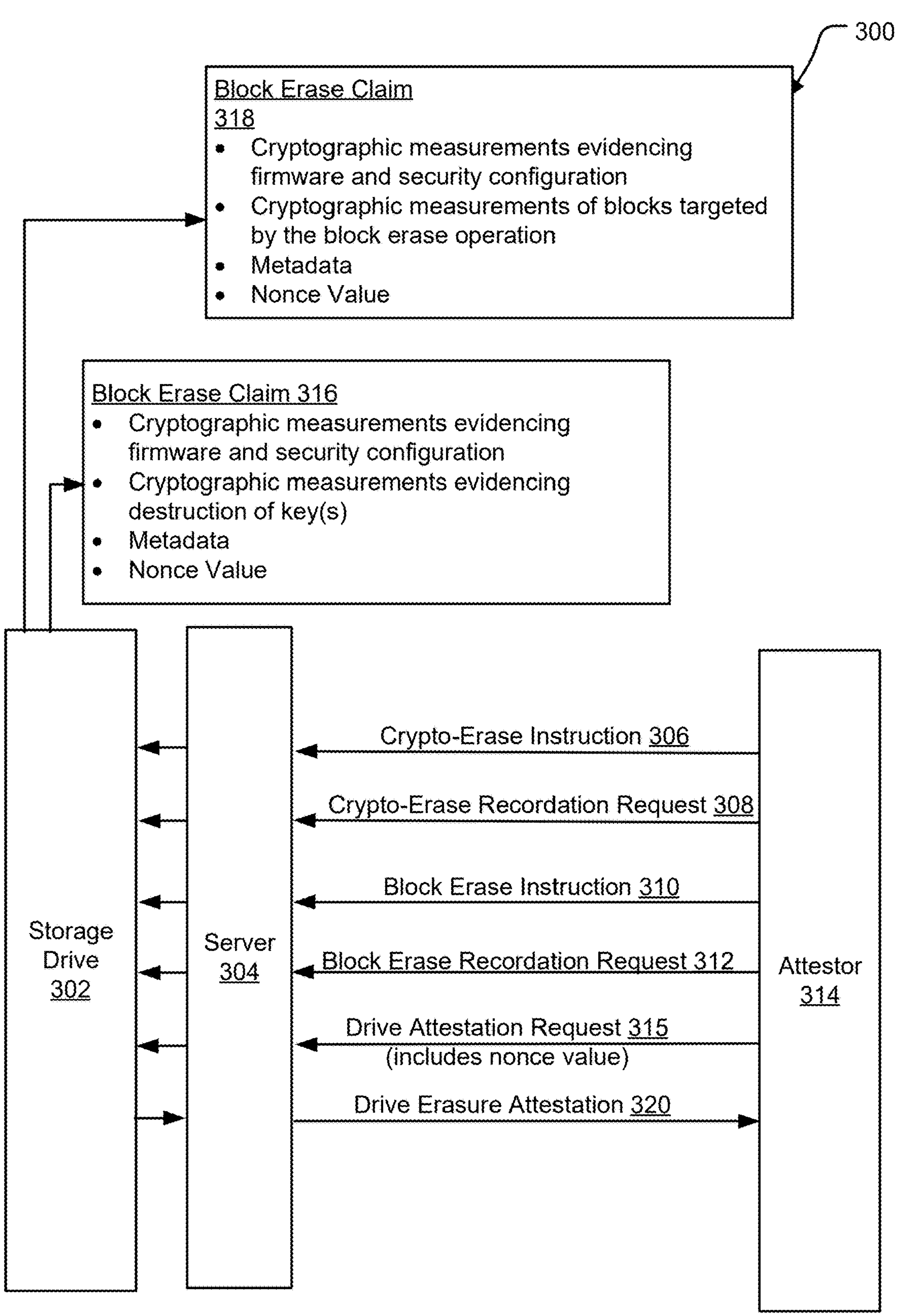
FIG. 3 illustrates an example system implementing additional aspects of the herein-disclosed attestable secure erase methodology.

FIG. 3 illustrates an example system 300 implementing additional aspects of the herein-disclosed attestable secure erase methodology. The system 300 includes an attestor 314, a server 304, and a storage drive 302, shown engaging in a series of communications that affect an erasure of user data followed by retrieval, from the storage drive 302, of cryptographic evidence that is usable to prove that the erasure occurred as intended.

In one implementation, the server 304 is a host that is communicatively coupled to the storage drive 302 via a physical coupling. The attestor 314 communicates with the server 304 over the internet. The attestor 314 orchestrates the illustrated flow of communications by transmitting various communications to the storage drive 302, with the server 304 acting as the intermediary. For example, the attestor 314 may use a web-based application programming interface (API) to communicate with the server 304 that, in turn, translates the communications received via the API into corresponding commands that are interpretable by a controller of the storage drive 302.

In the illustrated flow, an erase operation is initiated when the attestor 314 transmits a crypto-erase instruction 306, which the server 304 relays to the storage drive 302. The crypto-erase operation identifies a target range of data blocks on the storage drive 302, and an instruction to erase cryptographic key(s) used to encrypt or decrypt user data stored within the target range of data blocks. In response to receipt of the crypto-erase instruction, a ROT of the storage drive 302 identifies the encryption/decryption keys stored in association with the target range of data blocks and destroys the keys. Although not shown, the server 304 may transmit a confirmation of completion of the crypto-erase operation to the attestor 314 upon receipt of a corresponding completion signal from the storage drive 302.

In the illustrated flow, the attestor 314 next transmits a crypto-erase recordation request 308. The RoT of the storage drive 302 executes the crypto-erase recordation request 308 by collecting a first set of measurements that evidence the state of the storage drive at a time immediately following the crypto-erase operation. In one implementation, the collected measurements include measurements that evidence the firmware installed on the storage drive 302, measurements that evidence a current security configuration of the storage drive 302, and measurements of data cells targeted by the crypto-erase operation (e.g., the cells storing the cryptographic keys targeted for destruction). The ROT of the storage drive 302 applies a hashing algorithm to various subsets of the collected measurements and stores the resulting hash values in PCRs of a TPM chip.

Although not shown in FIG. 3, the crypto-erase recordation request 308 may be followed by a return communication to the attestor 314 that confirms the recordation of the crypto-erase operation.

The attestor 314 is next shown sequentially transmitting a block erase instruction 310 and a block erase recordation request 312. The block erase instruction 310 identifies (or includes information for identifying) a target range of data blocks on the storage drive 302 that are to be erased. In response to receipt of the block erase instruction 310, a read/write controller of the storage drive (e.g., a firmware controller that is separate from the RoT) erases user data stored in the target range of data blocks.

Following completion of the block erase instruction 310, the ROT of the storage drive 302 next executes the block erase recordation request 312 by collecting a second set of measurements that evidence a state of the storage drive following the block erase operation. In one implementation, this second set of measurements includes measurements that evidence the firmware installed on the storage drive 302, measurements that evidence a current security configuration of the storage drive 302, and measurements of data cells targeted by the block erase operation (e.g., data cells within a main memory region storing encrypted or unencrypted user data). The RoT of the storage drive 302 applies a hashing algorithm to various subsets of the measurements in the second set and stores the resulting hash values in PCRs of a TPM chip.

Although not shown in FIG. 3, the block erase recordation request may be followed by a return communication to the attestor 314 that confirms the recordation of the block erase operation.

The attestor 314 next transmits a drive attestation request 315 that includes a c value, and that instructs the ROT of the storage drive 302 to generate a drive erasure attestation 320 that includes a crypto-erase claim 316, and a block erase claim 318. The crypto-erase claim 316 includes the first set of encrypted measurements (first PCR values) recorded immediately following the crypto-erase operation, along with metadata representing a monotonic counter used in the Key Derivation Function and the provided nonce value. The block erase claim 318 includes a second set of encrypted measurements (second PCR values) recorded following the block-erase operation along with metadata, including a persistent monotonic counter of erase cycles and the nonce value.

In response to the drive attestation request 315, the storage drive 302 produces the drive erasure attestation 320, which includes the above-described information, along with an endorsement generated using a private identity key of an identity key pair assigned to the ROT of the storage drive 302. The drive erasure attestation 320 is transmitted to attestor 314 for claim verification and, ultimately, recordation on a ledger. In one implementation, claim verification and ledger recordation are performed as generally described with respect to FIG. 2.

Figure 4:
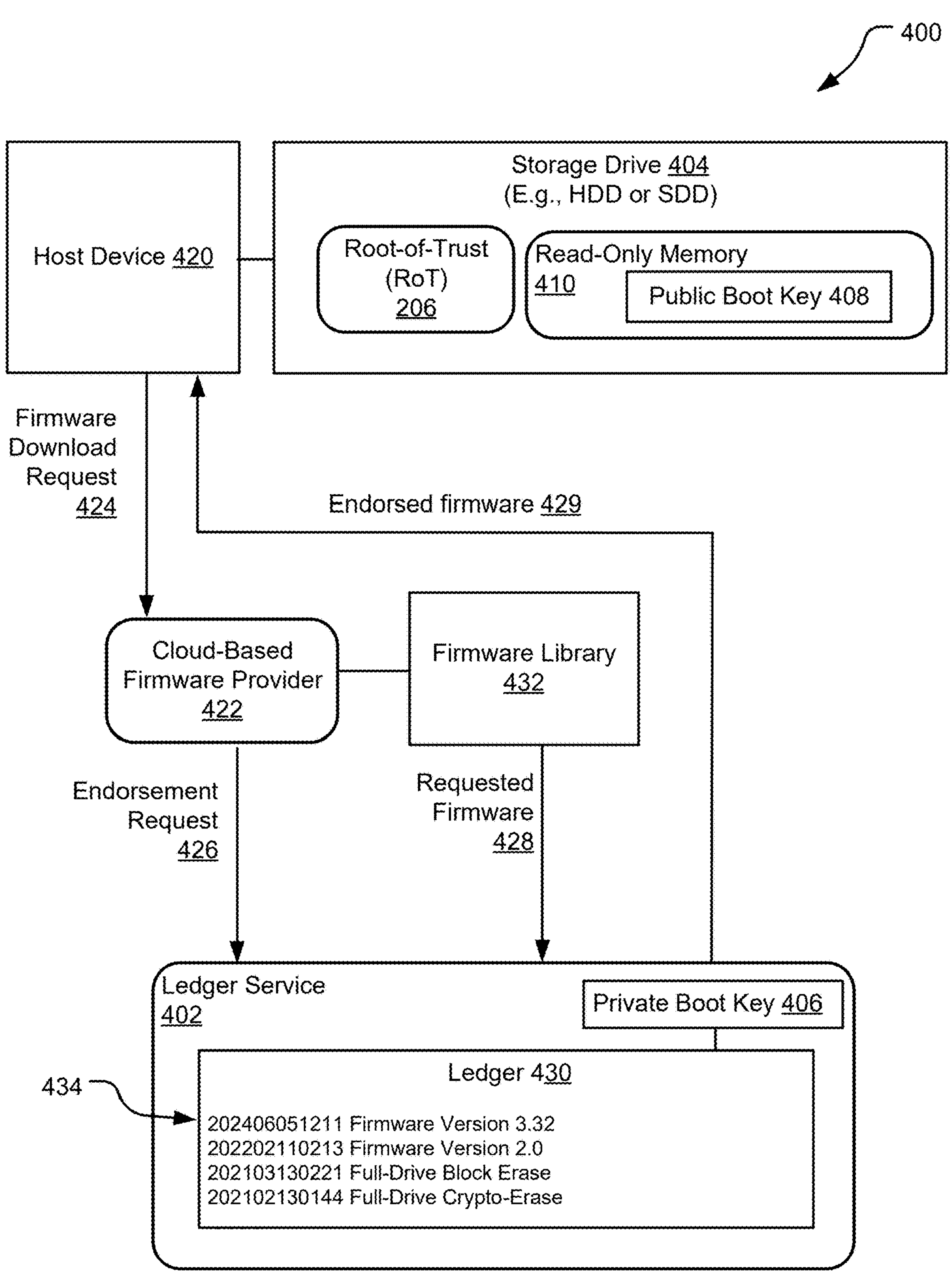
FIG. 4 illustrates operations performed by another example system to erase user data in a secure and verifiable manner.

FIG. 4 illustrates operations performed by another example, system 400, to erase user data from a storage drive in a secure and verifiable manner. The system 400 is shown to include a ledger service 402 that maintains a ledger 430 for a storage drive 404. In one implementation, the ledger 430 is a confidential ledger, accessible exclusively to an owner of data stored on the storage drive 404. The ledger 430 is maintained in association with a unique cryptographic identity assigned to the storage drive 404. The system 400 may be understood as including some or all of the subcomponents shown with respect to FIG. 1-3; however, the system 400 differs from FIG. 1-3 in that the ledger 430 provides some additional functionality not described elsewhere herein. Specifically, in this implementation, the ledger 430 is used to record firmware updates (e.g., in addition to erasure operations), and the ledger 430 additionally serves as the exclusive endorser of firmware that is loaded and booted on the storage drive 404.

In the system 400, a different asymmetric key pair is assigned to each different storage drive. This asymmetric key pair is used in firmware boot operations and is therefore referred to below as the "boot key pair," which includes both a private boot key 406 and a public boot key 408. The ledger service 402 securely maintains the private boot key 406. During a manufacturing process, the corresponding public boot key 408 is burned into a read-only memory 410 of the storage drive 404, as shown.

In FIG. 4, the storage drive 404 includes a root-of-trust (RoT) 407 that implements a secure boot and firmware update process that depends upon the use of the public boot key 408 to verify an endorsement of the ledger service 402. More specifically, the RoT 407 is configured to load only firmware that has been signed with the private boot key 406, which corresponds to the public boot key 408. On the other side of this exchange is the ledger service 402, which records each and every firmware endorsement associated with the storage drive 404 in the ledger 430.

The above-described assignment and use of the boot key pair facilitates the implementation of security measures that facilitate the realization of two objectives: (1) ensuring the storage drive 404 is prevented from loading or booting firmware obtained from a malicious party and (2) creating an immutable record that includes all firmware updates to the storage drive 404 such that it is possible to guarantee, at any given time, which firmware version is currently executing on the storage drive 404 and when that firmware version was installed.

Within FIG. 4, an illustrated exchange of communication facilities realization of the above-stated objectives. In this exchange, the storage drive 404 is coupled to a host device 420 that transmits a firmware download request 424 to a cloud-based firmware provider 422. For example, a user interacts with a web-based interface on the host device 420 to navigate to a website of the cloud-based firmware provider 422 that includes firmware files selectable for download. The user initiates transmission of the firmware download request 424 the request by selecting a particular firmware file for download. The firmware download request 424 includes a storage drive identifier that the ledger service 402 is able to use to uniquely identify the storage drive 404 and the boot key pair assigned to the storage drive 404.

In response to receiving the firmware download request 424, the cloud-based firmware provider 422 transmits an endorsement request to the ledger service 402. The endorsement request 426 includes the storage drive identifier and a firmware file identifier that uniquely identifies, e.g., from a firmware library 432, the firmware file that the user has requested to download.

The ledger service 402 checks out a copy of the requested firmware file ("requested firmware 428") and appends to the firmware file a digital signature created using the private boot key 406. In one implementation, the ledger service 402 creates the digital signature by applying an algorithm to create a hash of the contents of the requested firmware file. The ledger service 402 then encrypts the hash with the private boot key 406 and adds this encrypted hash—the digital signature—to the firmware file, yielding endorsed firmware 429 that the ledger service 402 then transmits back to the host device 420.

At the time of the above-described firmware file endorsement, the ledger service 402 also updates the ledger 430 maintained for the storage drive 404 to include a new entry 434 that identifies the endorsed firmware 429 (e.g., by version number, timestamp, and other relevant information). The ledger service 402 implements logic to ensure that each firmware file endorsed for a particular storage drive (e.g., the storage drive 404) is recorded in the ledger that uniquely corresponds to that particular storage drive (e.g., the ledger 430). Therefore, all firmware downloads initiated through the cloud-based firmware provider are recorded in a drive-specific ledger.

The host device 420 receives the endorsed firmware 429 and attempts to load the endorsed firmware 429 into the memory of the storage drive 404. However, prior to accepting the endorsed firmware 429 into memory, the RoT 407 attempts to enter a secure state that is conditioned upon verification of the endorsement (digital signature) in the endorsed firmware 429. In one example implementation, the RoT 407 verifies the endorsement by using the public boot key 408 to decrypt the signature in the endorsed firmware 429. This decryption returns the hash value that was computed by the ledger service based on the original firmware file. The RoT 407 applies a hashing algorithm (e.g., the same algorithm used by the ledger service 402 to create the hash) to the remainder of the received file contents, yielding a computed hash. If the computed hash matches the hash returned from the signature decryption operation, the endorsement is treated as "verified"; otherwise, the endorsement is treated as unverifiable. In implementations, different types of cryptographic signature schemes are used to verify the endorsement, including, for example, Rivest Shamir Adleman (RSA) (which uses decryption and digest compare, as described above), elliptic curve digital signature algorithm (ECDSA), and Leighton-Micali Signatures (LMS).

In the above-described scenario where the RoT 407 is able to verify the endorsement of the ledger service 402, the RoT 407 enters the secure state and permits loading of the endorsed firmware 429 into memory and boot of the firmware onto the storage drive 404. Otherwise, the RoT 407 rejects the download.

Per the above-described operations, the ledger service 402 acts as the exclusive endorser of firmware for the storage drive 404 and records each and every firmware file that is downloaded to the storage drive 404 within the ledger 430—making it possible for a device manufacturer or user to know with certainty that the currently-loaded firmware is trustworthy. The storage drive, in return, implements the logic that prevents it from booting and loading firmware that is not endorsed by the ledger service 402, thereby protecting the storage drive 404 from obtaining and loading malware.

Figure 5:
FIG. 5 illustrates example operations for using a secure attestable methodology for erasing user data from a storage drive.
Figure 5:
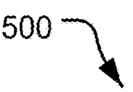
Figure 5:
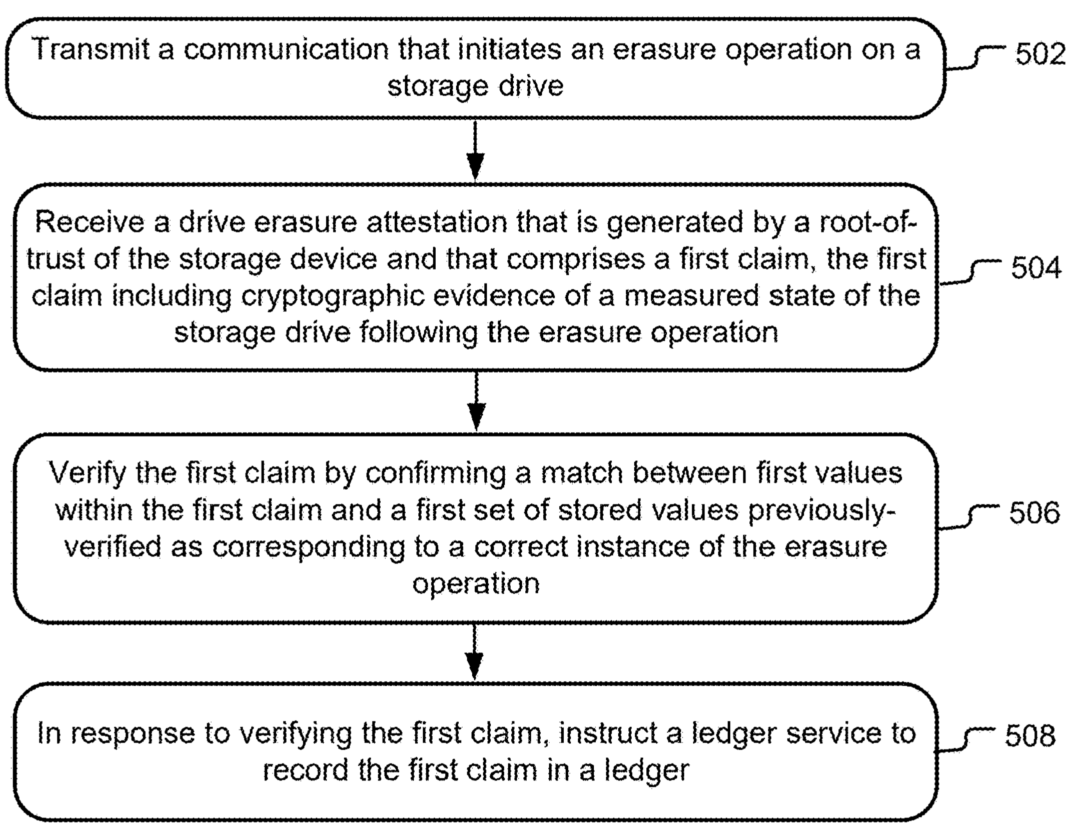

FIG. 5 illustrates example operations 500 for using a secure attestable methodology for erasing user data from a storage drive. A transmission operation 502 transmits a communication that initiates an erasure operation on a storage drive. In one implementation, the transmission operation 502 is a transmission from a web-based attestor to a processing device that acts as a host to the storage drive and is, for example, physically coupled to the storage drive. In some implementations, the transmission operation 502 is performed in response to a request initiated on the processing device that hosts the storage drive.

A receiving operation 504 receives a drive erasure attestation generated in association with the erasure operation and by a root-of-trust of the storage device. The drive erasure attestation includes at least a first claim that includes cryptographic evidence of a measured state of the storage drive following the erasure operation.

A verification operation 506 verifies the first claim by confirming a match between a first values included within the first claim and a first set of stored values previously-verified as corresponding to a correct implementation of the erasure operation.

A ledger update operation 508 instructs a ledger service to record the first claim in a ledger in response to verifying the first claim.

Figure 6:
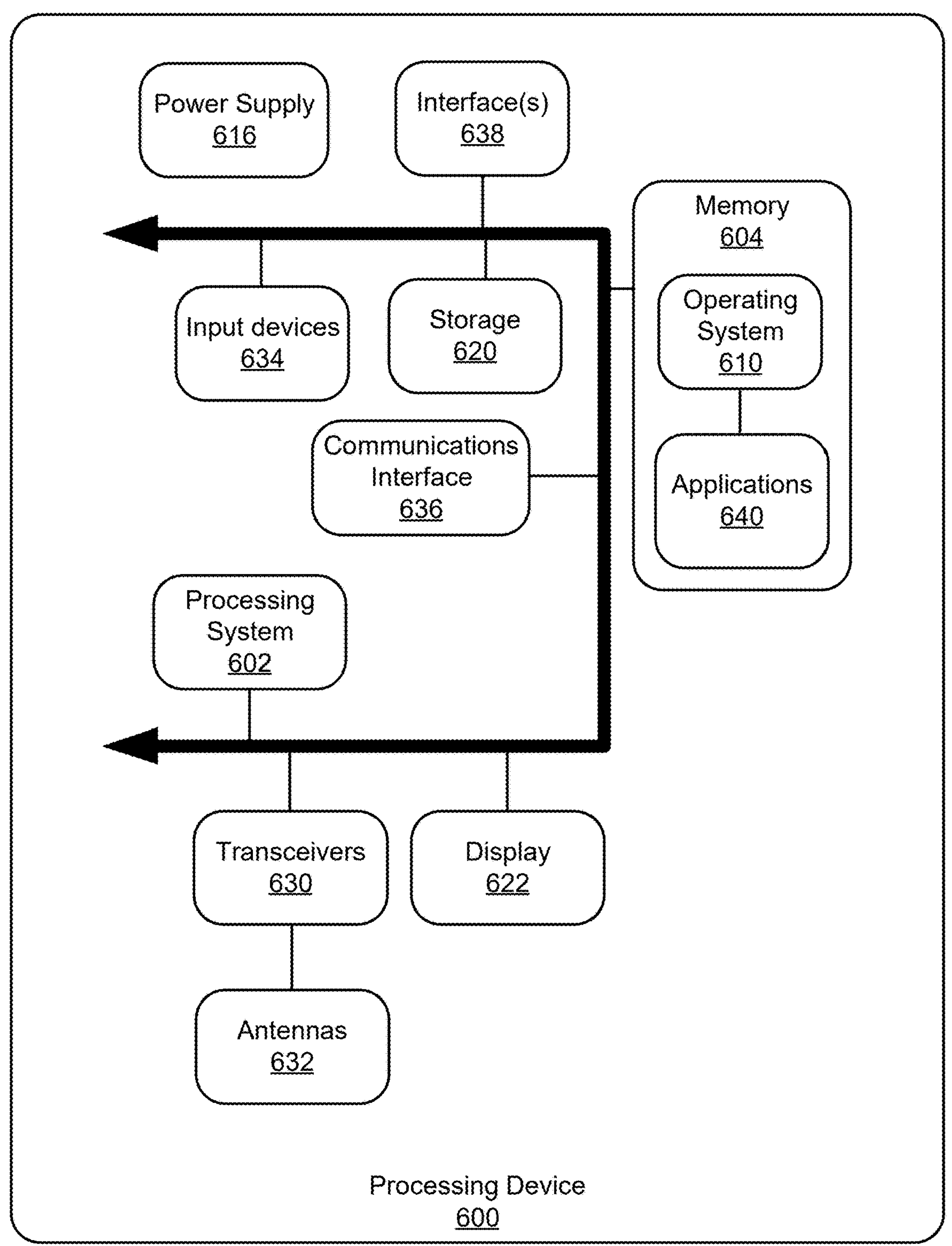
FIG. 6 illustrates an example schematic of a processing device suitable for implementing aspects of the disclosed technology.

FIG. 6 illustrates an example schematic of a processing device 600 suitable for implementing aspects of the disclosed technology. The processing device 600 includes a processing system 602, memory 604, a display 622, and other interfaces 638 (e.g., buttons). The processing system 602 may have one or more computer processing units (CPUs), graphics processing units (GPUs), etc.

The memory 604 generally includes both volatile memory (e.g., random access memory (RAM)) and non-volatile memory (e.g., flash memory). An operating system 610 resides in the memory 604 and is executed by the processing system 602. One or more applications 640 are loaded in the memory 604 and executed on the operating system 610 by the processing system 602 (e.g., application(s) that provide the functionality described with respect to the attestor 114 of FIG. 1 or the attestor 218 of FIG. 2; functionality of the auditor 126 of FIG. 1 or the auditor 214 of FIG. 2, the functionality of the ledger service 132 or the ledger service 227, or the herein described functionality of a host device that commands a storage device to perform operations related to data erasure, claim recordation, and drive erasure attestation). The applications 640 may receive inputs from one another as well as from various input local devices 634 such as a microphone, input accessory (e.g., keypad, mouse, stylus, touchpad, gamepad, racing wheel, joystick), or a camera.

Additionally, the applications 640 may receive input from one or more remote devices, such as remotely-located servers or smart devices, by communicating with such devices over a wired or wireless network using more communication transceivers 630 and an antenna 632 to provide network connectivity (e.g., a mobile phone network, Wi-Fi®, Bluetooth®). The processing device 600 may also include one or more storage drives 620 (e.g., non-volatile storage), such as storage drives that include a root-of-trust configured to produce claims and attest to erase operations as generally described herein.

The processing device 600 further includes a power supply 616, which is powered by one or more batteries or other power sources and provides power to other components of the processing device 600. The power supply 616 may also be connected to an external power source (not shown) that overrides or recharges the built-in batteries or other power sources.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer-readable instructions, data structures, program modules, or other data. Tangible computer-readable storage media includes RAM, read-only memory (ROM), electrically erasable programmable read-only memory (EEPROM), flash memory or other memory technology, CDROM, digital versatile disks (DVD) or other optical disk storage, magnetic cassettes, magnetic tape, magnetic disk storage or other magnetic storage drives, or any other tangible medium which can be used to store the desired information, and which can be accessed by the processing device 600. In contrast to tangible computer-readable storage media, intangible computer-readable communication signals may embody computer-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. For example, intangible communication signals include wired media such as a wired network or direct-wired connection, and wireless media such as acoustic, radio frequency (RF), infrared, and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, to instruct a computer to perform a certain operation segment. The instructions may be implemented using any suitable high-level, low-level, object-oriented, visual, compiled, and/or interpreted programming language.

In some aspects, the techniques described herein relate to a method of securely erasing data on a storage drive, the method including: transmitting a communication that initiates an erasure operation on a storage drive; receiving a drive erasure attestation generated in association with erasure operation and by a root-of-trust of the storage drive, the drive erasure attestation including a first claim that includes cryptographic evidence of a measured state of the storage drive following the erasure operation; verifying the first claim by confirming a match between first measurement values in the first claim and a first set of stored values previously-verified as corresponding to a correct implementation of the erasure operation; and in response to verifying the first claim, instructing a ledger service to record the drive erasure attestation in a ledger.

In some aspects, the techniques described herein relate to a method, wherein the drive erasure attestation includes a digital signature generated using a first private key uniquely assigned to a root-of-trust within the storage drive, and wherein the ledger is maintained in association with a first public key of the storage drive that is usable to authenticate the digital signature.

In some aspects, the techniques described herein relate to a method, wherein the storage drive has been used to store user data associated with a virtual machine (VMs) managed by a hypervisor, and wherein the ledger is maintained within a security boundary that is off-limits to the hypervisor.

In some aspects, the techniques described herein relate to a method, wherein instructing the storage drive to perform the erasure operation further includes: transmitting a communication that initiates a crypto-erase operation on the storage drive, wherein the first measurement values include first PCR values corresponding to measurements of values residing in memory locations or hardware registers associated with one or more cryptographic keys targeted for erasure by the crypto-erase operation.

In some aspects, the techniques described herein relate to a method, wherein verifying the first claim includes confirming a match between the first PCR values and a set of auditor-verified values confirmed as corresponding to a correct implementation of the crypto-erase operation.

In some aspects, the techniques described herein relate to a method, further including: transmitting a communication that initiates a block erase operation on the storage drive, wherein the drive erasure attestation includes a second claim storing a second set of PCR values, the second set of PCR values corresponding to measurements of the block erase operation.

In some aspects, the techniques described herein relate to a method, wherein the method further includes: verifying the second claim by confirming a match between the second set of PCR values and a second set of stored values that have been previously-verified, by an auditor, as corresponding to a device state configuration that correctly implements the block erase operation.

In some aspects, the techniques described herein relate to a method, wherein instructing a ledger service to record the drive erasure attestation is performed in response to verifying both the first claim and the second claim.

In some aspects, the techniques described herein relate to a method, further including: transmitting a recordation instruction that causes the root-of-trust following execution of the erasure operation; transmitting a drive attestation request that causes the storage drive to generate the drive erasure attestation, wherein the drive attestation request includes a nonce value and the drive erasure attestation includes the nonce value.

In some aspects, the techniques described herein relate to a system for securely erasing data on a storage drive, the system including: an attestor stored in memory and executable to: instruct the storage drive to perform an erasure operation; receive a drive erasure attestation generated by a root-of-trust of the storage drive, the drive erasure attestation including a first claim including cryptographic evidence of a measured state of the storage drive following the erasure operation and a digital signature generated using a first private key of the storage drive; verify the first claim by confirming a match between values in the first claim and first set of stored values previously-verified as corresponding to a correct implementation of the erasure operation; and in response to verifying the first claim, instruct a ledger service to record the drive erasure attestation in a ledger maintained in association with a first public key of the storage drive, the first public key being usable to authenticate the digital signature within drive erasure attestation.

In some aspects, the techniques described herein relate to a system, wherein the attestor is further configured to: transmit a communication that initiates a crypto-erase operation on the storage drive, wherein the first claim includes a first set of PCR values corresponding to measurements evidencing erasure of one or more cryptographic keys.

In some aspects, the techniques described herein relate to a system, wherein the attestor verifies the first claim by confirming a match between the first set of PCR values and a set of auditor-verified values confirmed as corresponding to a correct implementation of the crypto-erase operation.

In some aspects, the techniques described herein relate to a system, wherein the attestor is further configured to: transmit a communication that initiates a block erase operation on the storage drive, wherein the drive erasure attestation includes a second claim storing a second set of PCR values corresponding to measurements of the block erase operation.

In some aspects, the techniques described herein relate to a system, wherein attestor is further configured to: verify the second claim by confirming a match between the second set of PCR values and a second set of stored values that have been previously-verified, by an auditor, as corresponding to a device state configuration that correctly implements the block erase operation.

In some aspects, the techniques described herein relate to a system, wherein a read-only memory of the storage drive stores a public boot key corresponding to a private boot key maintained by the ledger service, and wherein the storage drive implements logic that exclusively boots firmware verified as including an endorsement created using the private boot key.

In some aspects, the techniques described herein relate to a system, wherein the ledger service is configured to use the private boot key to endorse exclusively firmware updates that are first recorded in the ledger.

In some aspects, the techniques described herein relate to one or more tangible computer-readable storage media encoding processor-executable operations of a computer process that securely erases user data from a storage drive, the computer process including: instructing the storage drive to execute a crypto-erase operation; instructing the storage drive to record a first claim including cryptographic evidence of a measured state of the storage drive following the crypto-erase operation; instructing the storage drive to execute a block erase operation; instructing the storage drive to record a second claim including cryptographic evidence of a measured state of the storage drive following the block erase operation receiving, from a root-of-trust of the storage drive, a drive erasure attestation that includes the first claim, the second claim, and a digital signature generated using a first private key of the storage drive; verifying the first claim by confirming a match between first measurement values included in the first claim and first set of stored measurement values previously-verified as corresponding to a correct implementation of the crypto-erase operation; verifying the second claim by confirming a match between second measurement values in the second claim and a second set of stored measurement values previously-verified as corresponding to a correct implementation of the block erase operation; and in response to verifying the first claim and the second claim, instructing a ledger service to record the first claim and the second claim in a ledger.

In some aspects, the techniques described herein relate to one or more tangible computer-readable storage media, wherein the drive erasure attestation includes a digital signature generated using a private identity key uniquely identifying to the root-of-trust of the storage drive.

In some aspects, the techniques described herein relate to one or more tangible computer-readable storage media, wherein the first set of stored measurement values and the second set of stored measurement values are defined by a manufacturer of the storage drive and verified by a third-party auditor.

In some aspects, the techniques described herein relate to one or more tangible computer-readable storage media, further including: transmitting, to the ledger service, an erasure attestation that includes the first claim, the second claim, and a chain of endorsements, and wherein the ledger service is configured to conditionally update the ledger in response to verifying all endorsements in the chain of endorsements. The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language. The above specification, examples, and data, together with the attached appendices, provide a complete description of the structure and use of exemplary implementations.

What is claimed is:

1. A method of securely erasing data on a storage drive, the method comprising:

transmitting a communication that initiates a crypto-erase operation on the storage drive;

receiving a drive erasure attestation generated in association with erasure operation and by a root-of-trust of the storage drive, the drive erasure attestation comprising a first claim that includes cryptographic evidence including a first set of hashed measurement values corresponding to measurements of values residing in memory locations or hardware registers associated with one or more cryptographic keys targeted for erasure by the crypto-erase operation, the first set of hashed measurements indicating measured state of the storage drive following the crypto-erase operation;

verifying the first claim by confirming a match between the first set of hashed measurement values in the first claim and a second set of measurement values from a manufacturer of the storage device, the second set of measurement values having been previously-verified as corresponding to a correct implementation of the crypto-erase operation; and in response to verifying the first claim, instructing a ledger service to record the drive erasure attestation in a ledger.

2. The method of claim 1, wherein the drive erasure attestation includes a digital signature generated using a first private key uniquely assigned to a root-of-trust within the storage drive, and wherein the ledger is maintained in association with a first public key of the storage drive that is usable to authenticate the digital signature.

3. The method of claim 1, wherein the storage drive has been used to store user data associated with a virtual machine (VMs) managed by a hypervisor, and wherein the ledger is maintained within a security boundary that is off-limits to the hypervisor.

4. The method of claim 1, wherein instructing the storage drive to perform the crypto-erase operation further comprises:

transmitting a communication that initiates the crypto-erase operation on the storage drive, wherein the first measurement values include first platform configuration register (PCR) values corresponding to the measurements of values residing in the memory locations or the hardware registers associated with the one or more cryptographic keys targeted for erasure by the crypto-erase operation.

5. The method of claim 4, wherein verifying the first claim includes confirming the match between the first PCR values and a set of auditor-verified values confirmed as corresponding to the correct implementation of the crypto-erase operation.

6. The method of claim 4, further comprising:

transmitting a communication that initiates a block erase operation on the storage drive, wherein the drive erasure attestation includes a second claim storing a second set of PCR values, the second set of PCR values corresponding to measurements of the block erase operation.

7. The method of claim 6, wherein the method further comprises:

verifying the second claim by confirming a match between the second set of PCR values and a second set of stored values that have been previously-verified, by an auditor, as corresponding to a device state configuration that correctly implements the block erase operation.

8. The method of claim 6, wherein instructing a ledger service to record the drive erasure attestation is performed in response to verifying both the first claim and the second claim.

9. The method of claim 1, further comprising:

transmitting a recordation instruction that causes the root-of-trust of the storage drive to record the first claim following execution of the crypto-erase operation;

transmitting a drive attestation request that causes the storage drive to generate the drive erasure attestation, wherein the drive attestation request includes a nonce value and the drive erasure attestation includes the nonce value.

10. A system for securely erasing data on a storage drive, the system comprising:

an attestor stored in memory and executable to:

instruct the storage drive to perform a crypto-erase operation;

receive a drive erasure attestation generated by a root-of-trust of the storage drive, the drive erasure attestation comprising a first claim including cryptographic evidence including a first set of hashed measurement values corresponding to measurements of values residing in memory locations or hardware registers associated with one or more cryptographic keys targeted for erasure by the crypto-erase operation, the first set of hashed measurements indicating a measured state of the storage drive following the crypto-erase operation and a digital signature generated using a first private key of the storage drive;

verify the first claim by confirming a match between the first set of hashed measurement values in the first claim and a second set of measurement values from a manufacturer of the storage device, the second set of measurement values having been previously-verified as corresponding to a correct implementation of the crypto-erase operation; and in response to verifying the first claim, instruct a ledger service to record the drive erasure attestation in a ledger maintained in association with a first public key of the storage drive, the first public key being usable to authenticate the digital signature within the drive erasure attestation.

11. The system of claim 10, wherein the attestor is further configured to:

transmit a communication that initiates the crypto-erase operation on the storage drive, wherein the first claim includes a first set of platform configuration register (PCR) values corresponding to the measurements evidencing erasure of the one or more cryptographic keys.

12. The system of claim 11, wherein the attestor verifies the first claim by confirming the match between the first set of PCR values and a set of auditor-verified values confirmed as corresponding to the correct implementation of the crypto-erase operation.

13. The system of claim 12, wherein the attestor is further configured to:

transmit a communication that initiates a block erase operation on the storage drive, wherein the drive erasure attestation includes a second claim storing a second set of PCR values corresponding to measurements of the block erase operation.

14. The system of claim 13, wherein attestor is further configured to:

verify the second claim by confirming a match between the second set of PCR values and a second set of stored values that have been previously-verified, by an auditor, as corresponding to a device state configuration that correctly implements the block erase operation.

15. The system of claim 11, wherein a read-only memory of the storage drive stores a public boot key corresponding to a private boot key maintained by the ledger service, and wherein the storage drive implements logic that exclusively boots firmware verified as including an endorsement created using the private boot key.

16. The system of claim 15, wherein the ledger service is configured to use the private boot key to endorse exclusively firmware updates that are first recorded in the ledger.

17. One or more tangible computer-readable storage media encoding processor-executable operations of a computer process that securely erases user data from a storage drive, the computer process comprising:

instructing the storage drive to execute a crypto-erase operation;

instructing the storage drive to record a first claim including cryptographic evidence including a first set of hashed measurement values corresponding to measurements of values residing in memory locations or hardware registers associated with one or more cryptographic keys targeted for erasure by the crypto-erase operation, the first set of hashed measurements indicating a measured state of the storage drive following the crypto-erase operation;

instructing the storage drive to execute a block erase operation;

instructing the storage drive to record a second claim including cryptographic evidence of a measured state of the storage drive following the block erase operation receiving, from a root-of-trust of the storage drive, a drive erasure attestation that includes the first claim, the second claim, and a digital signature generated using a first private key of the storage drive;

verifying the first claim by confirming a match between the first set of hashed measurement values included in the first claim and a second set of measurement values from a manufacturer of the storage device, the second set of measurement values having been previously-verified as corresponding to a correct implementation of the crypto-erase operation;

verifying the second claim by confirming a match between second measurement values in the second claim and a second set of stored measurement values previously-verified as corresponding to a correct implementation of the block erase operation; and in response to verifying the first claim and the second claim, instructing a ledger service to record the first claim and the second claim in a ledger.

18. The one or more tangible computer-readable storage media of claim 17, wherein the drive erasure attestation includes a digital signature generated using a private identity key uniquely identifying to the root-of-trust of the storage drive.

19. The one or more tangible computer-readable storage media of claim 17, further comprising:

transmitting, to the ledger service, an erasure attestation that includes the first claim, the second claim, and a chain of endorsements, and wherein the ledger service is configured to conditionally update the ledger in response to verifying all endorsements in the chain of endorsements.

20. The method of claim 1, wherein the first set of hashed measurements are stored in platform configuration registers of the root-of-trust of the storage device.

* * * * *